July 14, 1970 JAMES E. WEBB 3,520,660
ADMINISTRATOR OF THE NATIONAL AERONAUTICS
AND SPACE ADMINISTRATION
LIGHT DETECTION INSTRUMENT
Filed Sept. 9, 1966 2 Sheets-Sheet 1
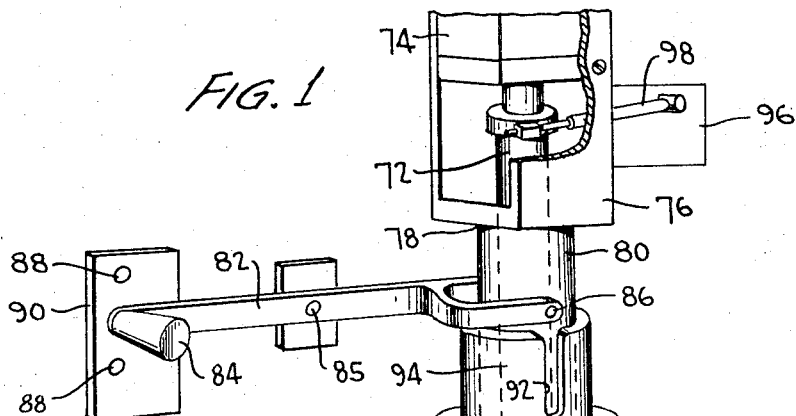
INVENTORS,
EMMETT W. CHAPPELLE
DUANE G. HOFFMAN
BY
ATTORNEYS July 14, 1970   JAMES E. WEBB   3,520,660
ADMINISTRATOR OF THE NATIONAL AERONAUTICS
AND SPACE ADMINISTRATION
LIGHT DETECTION INSTRUMENT
Filed Sept. 9, 1966   2 Sheets-Sheet 2

INVENTORS,
EMMETT W. CHAPPELLE
DUANE G. HOFFMAN
BY
ATTORNEYS

United States Patent Office 3,520,660
Patented July 14, 1970

3,520,660
LIGHT DETECTION INSTRUMENT
James E. Webb, Administrator of the National Aeronautics and Space Administration, with respect to an invention of Emmett W. Chappelle, Baltimore, Md., and Duane G. Hoffman, Fairfax, Va.
Filed Sept. 9, 1966, Ser. No. 578,925
Int. Cl. G01n 1/14, 31/14
U.S. Cl. 23—253          16 Claims

ABSTRACT OF THE DISCLOSURE

An apparatus for producing, detecting, and measuring light, emitted as a result of an ATP-luciferin-luciferase biochemical reaction, includes a reactant holder containing a plurality of cuvettes slidably mounted and a syringe holder containing a syringe and positionable with respect to the cuvettes so as to permit injecting, at any one instant of time, of the ATP containing sample into any one of the cuvettes. The light quanta emission, upon the reaction taking place in the cuvette, is detected and coupled in the form of an electrical signal to an indicating means. The syringe is operated hydraulically by a servomechanism which insures that the indicating means operates only when injection takes place.

---

The invention described herein was made in the performance of work under a NASA contrast and is subjected to the provisions of Section 305 of the National Aeronautics and Space Act of 1958, Public Law 85–658 (72 Stat. 435: 432 U.S.C. 457).

This invention relates to an apparatus for the detection of the presence of cellular products; and, more particularly, to an apparatus for detecting and measuring light which is emitted as a result of the ATP-luciferin-luciferase biochemical reaction.

The substance ATP (adenosinetriphosphate) is a biochemical constituent of all known living cells. The detection of this substance is evidence of the presence of cellular products and, therefore, life processes as far as they are known. One method of determining ATP involves the use of the firefly-lantern enzyme which, when combined with ATP, will produce a bioluminescent reaction proportional to the amount of ATP present in a test sample.

The basic firefly lantern-enzyme reaction takes place in the following steps:

(a)
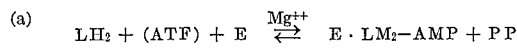

(b)
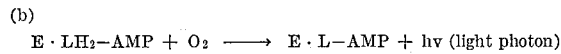

where $LH_2$=Luciferin
E=Enzyme (luciferase)
PP=Pyrophosphate
L=Dehydroluciferin
AMP=Adenylic acid If all the components of the above reaction, with the exception of ATP, are present in excess, the emission of light is quantitatively specific for the amount of ATP introduced.

The applications of the bioluminescent reaction are numerous and may be used wherever it is desired to determine if some form of life is present such as the detection of biological warfare agents, the monitoring of effectiveness of sterilization procedures, the levels of bacteria or other micro-organisms in air, water, food, or the like, and in many other areas of research.

Several problems are involved in the use of the firefly-lantern enzyme reaction to detect living matter. One of these problems is the accurate control of the amount of ATP containing matter into the enzyme mixture. Without the use of a controlled quantity of ATP sample into the enzyme mixture the light emitted from the bioluminescent reaction will not have any quantitiative significance. Another problem is that the reaction produces a very low level of illumination, and therefore, sensitive light detecting means must be provided in order to quantitatively determine the amount of light emitted from the reaction.

It is therefore an object of this invention to provide an instrument for producing, detecting and measuring the light output of the firefly lantern-enzyme reaction.

Another object of this invention is to provide for accurate measurement of the ATP sample introduced into the enzyme mixture.

Yet another object of this invention is to provide for accurate detection of the light output from the bioluminescent reaction of firefly-lantern enzyme with samples of ATP containing matter.

Stll another object of this invention is the provision of an instrument which will indicate the presence and amount of ATP in a test sample by the precise measurement of the light emitted from the reaction of the test sample in the firefly-lantern enzyme.

The foregoing objects and other objects are achieved by the ATP detection instrument which utilizes a cuvette assembly containing the firefly-lantern enzyme mixture in a light tight reaction chamber. The cuvette assembly is placed in front of a light collecting optical system and beneath a hydraulically driven syringe that is filled with a sample of ATP. The injection of a quantity of ATP into the enzyme mixture results in the emission of light quanta which are collected by the optical system.

Further objects and features of the invention will best be understood and appreciated from the following detailed description of a preferred embodiment thereof, selected for purposes of illustration and shown in the accompanying drawings, in which:

FIG. 1 is a side elevational perspective view of a reaction chamber constructed according to the present invention;

FIG. 2 is an enlarged view showing in more detail the connection between the positioning rod and the cuvette holder of the reaction chamber of FIG. 1;

FIG. 3 is a sectional view taken along line 3—3 of FIG. 2; and

Figure 4:
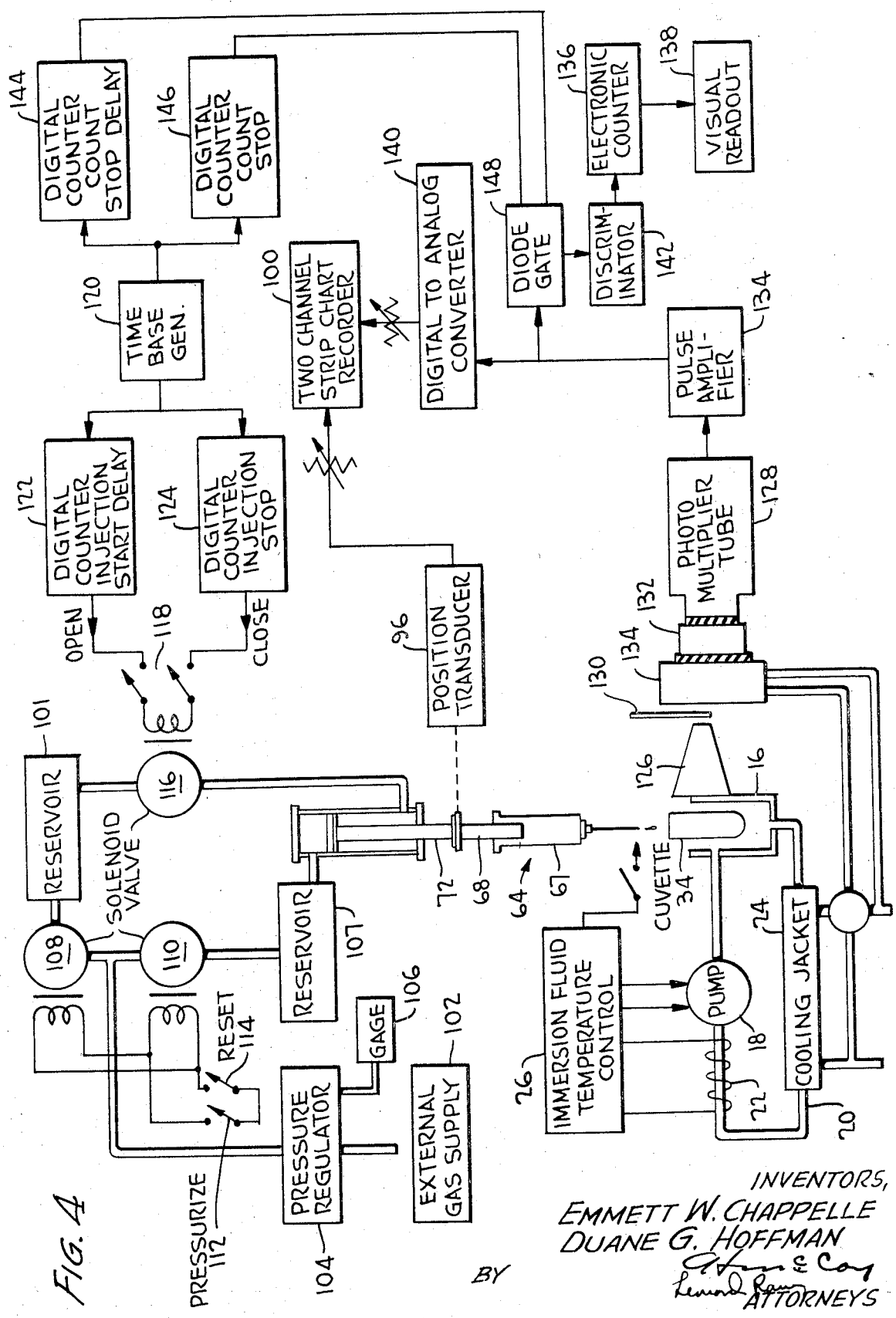
FIG. 4 is a schematic representation showing the relationship of parts used in producing, detecting and measuring the light output from the reaction chamber.

Referring now to FIG. 1 of the drawings, the numeral 10 refers to the main housing of the reaction chamber constructed in accordance with the present invention. The housing is generally T-shaped providing a recess 12 which is closed by a door 14 hinged to housing 10 which makes a light tight closure when secured shut with suitable latches (not shown). The interior sides of the housing 10 are preferably painted black to eliminate internal light reflections.

Within the recess 12 is a U-shaped cuvette holder channel 16 which is filled with immersion fluid that is used to control the temperature of the enzyme mixture in the cuvette holder. The fluid in the immersion bath is in a closed system and is circulated by a small vane pump 18. The fluid is pumped through tubing 20 and there are two heat exchangers attached to sections of this tubing. One heat exchanger consists of an electrical resistance element 22 which is used to introduce heat to the fluid; the other heat exchanger is a cold water jacket 24 which removes heat from the immersion fluid when external cooler water is circulated through the jacket. The temperature of the immersion fluid is controlled by a suitable fluid temperature controller 26.

Within the cuvette holder channel 16 is placed a cuvette holder 28. Although other types of cuvette holders may be utilized, the cuvette holder 28 will be used for the purpose of illustration. The cuvette holder 28 comprises a body member 30 having a plurality of openings 32 to receive test tube like cuvettes 34. The cuvettes 34 sit on supports 36 located within openings 38. The openings 38 are required to allow the light from the reaction to pass to the light detecting system described below. The cuvette holder 28 is moved along the holder channel 16 bp means of a positioning rod 40.

The positioning rod 40 comprises a handle 42, and an indexed rod 44 having grooves 46 at spaced points along the indexed rod 44. For purposes to be explained below, the number of grooves 46 are equal to the number of cuvettes in the cuvette holder. To connect the positioning rod 40 to the cuvette holder 28, there is provided a cylindrical member 48 integrally formed with indexed rod 44. Cylindrical member 48 is formed of a slightly larger diameter than indexed rod 44 so as to be held by the retaining means in the cuvette holder 28. This retaining means consists of a cylindrical opening 50 in the cuvette holder 28 with a slot opening 52 adjacent said opening 50. The cylindrical opening 50 is of a size to receive cylindrical member 48 while the slot opening 52 is of a size to receive the indexed rod 44.

The positioning rod 40 is held to the reaction chamber 10 by support 54 through which the positioning rod passes. On the support 54 is a snap lock 56 which retains the positioning rod in adjusted position as it moves the cuvette holder 28. The snap lock 56 comprises a handle 58 attached to a bolt 60 which is biased into positioning rod retention position by a spring 62. By pulling on the handle 58, the bolt 60 is displaced from one of the indexed grooves 46 permitting movement of the positioning rod in either direction. Each index groove places one cuvette 34 in position for receiving of the sample to be tested. The positioning rod can be rotated about its axis for minor changes in positioning. When one cuvette 32 is properly centered, all cuvettes will be properly centered by the index grooves on the positioning rod.

The injected component of the reaction is placed in a syringe 64 which is positioned in a holder 66 directly over the center of the cuvette 34 positioned for injection within the reaction chamber. The syringe body 67 is supported in the holder and the extended plunger 68 is supported by a spring clamp 70 at the top of the reaction chamber.

The spring clamp 70 is attached to the piston 72 of a hydraulic cylinder 74. The hydraulic cylinder 74 is external of the reaction chamber and is mounted on a movable support member 76. The movable support member is attached to one end 78 of a sliding member 80 and the syringe holder 66 is attached to the opposite end 82 of the sliding member 80. Upon actuation of the hydraulic cylinder 74, the piston 72 which under pressure is slidable relative to sliding member 80 causes the syringe plunger 68 to be pushed into the syringe barrel body 67. By controlling the hydraulic cylinder displacement, the volume of sample injected into the enzyme mixture cuvette 34 can be metered.

The entire hydraulic cylinder syringe holder combination is movable in the vertical direction upon movement of sliding member 80. The movement is controlled by a lever 82 fitted with a handle 84. The lever 82 which is pivoted to a support at 85 is attached to the sliding member 80 through a pin 86. This assembly is made movable because the syringe must be immersed in the enzyme mixture when an injection takes place, but must be lifted clear of cuvette 34 when the cuvette holder 28 is moved to place a different cuvette in position for a reaction. The lever is retained in raised or lowered position by means of a ball lock (not shown) in the handle 84 base which snaps into depressions 88 on plate 90. The pivot pin 86 is slidable in a slot 92 in a bearing plate 94 which is attached to the reaction chamber 10.

The displacement of the hydraulic cylinder piston 72 is measured by a position transducer 96. This sensor produces an electrical output which is a function of the angular position of the shaft of the sensor which is mechanically coupled to the hydraulic cylinder piston with a bar link 98. The output of this position sensor is connected to one channel of the two channels strip chart recorder indicated at 100 in FIG. 3.

The hydraulic cylinder is pressurized by an external gas supply shown at 102. This gas supply pressure is regulated by a suitable pressure regulator 104 to which a pressure gage 106 is connected. The application of pressure to the hydraulic fluid in reservoirs 107 is controlled by fast acting electrical solenoid valves 108 and 110. These solenoid valves 108, 110 control the direction of fluid flow and are operated by push button switches 112, 114, one "pressurized," and the other, "reset." When the piston of the hydraulic cylinder is extended (syringe plunger depressed) the cylinder may be returned to the starting position by actuating "reset" switch 114. This retracts the piston back into the cylinder. To allow the piston to push the syringe, the pressure on the fluid must be reversed, and this is accomplished by actuating "pressurize" switch 112.

The displacement of the hydraulic cylinder is controlled by electrically opening a solenoid valve 116 to start the movement, and by closing it to stop the movement. A switch 118 is used to open and close the solenoid valve. Although the switch 118 may be operated manually, because of the short actuation times involved, it is preferable to utilize an electric timer 120 to generate the open and close signals through suitable digital counters 122, 124.

The light generated as a result of the injection of a sample into an enzyme-mixture is radiated from the cuvette 34. A reflector plug 125 with a reflective surface facing the cuvette holder 30 is mounted in the front of the cuvette holder channel 16 to insure that all of the radiated light is directed toward the back surface of the holder channel 16 to be received by a light collector 126. This light collector 126, which is preferably made of Plexiglas, is a reflectorized conically-shaped piece mounted in the back surface of the channel 16 at a level even with the cuvette 34 in position under the syringe 64. The light collector 126 conducts the light to a photosensitive element, such as a photomultiplier tube 128 which is sensitive to light and produces an electrical signal in response to and proportional to receive radiant energy. To protect the phototube 128 from outside light when the reaction chamber door 14 is opened, a dark slide 130 which acts as a shutter is interposed between the end of the light collector 126 and the phototube 128. This is necessary because exposure of the phototube to high light levels desensitizes the phototube and raises the noise level for several hours. In order to reduce the thermal emission of electrons from the photocathode of the photomultiplier tube a thermoelectric cooler 132 is used in conjunction with a water cooled heat sink 134.

The pulse amplitudes produced by the photomultiplier tube 128 are generally not adequate to drive a pulse counting device so they are amplified in an amplifier 134. Although many types of amplifiers can be utilized, it is preferred that the gain of the amplifier 128 be 250 at a frequency of 10 kc., and the bandwidth of the amplifier be such that the gain at 1 mc. is 60. This bandwidth assures the amplification of the leading edge of the pulses which are used to actuate an electronic counter 136 to produce a visual readout 138. The output from the amplifier 134 is also passed into a digital to analog converter 140 and then to recorder 100 to produce a graphical record of the pulse output.

In order to discriminate against low voltage pulses, an amplitude control discriminator 142 is inserted in the output circuit of the pulse amplifier. This discriminator 142 is basically a potentiometer which will only transmit pulses of sufficient magnitude to actuate the counter 136.

To insure that the electronic counter 136 will operate only when a sample is being injected, the counter 136 is connected to digital counters 144, 146 through a diode gate 148. The diode 148 is normally biased so that it is not conducting and hence an open circuit. When pulses are to be counted, the bias voltage is removed by the digital counter 144 so that the diode will conduct pulses from the amplifier 134 to the counter 136. Since the digital counters 144, 146 are connected to the same time base generator 120 as digital counters 122, 124 which are used to control the hydraulic system, the counter 136 will operate only when injection is taking place. This in effect allows the integration of light emission over an extended period of time thereby increasing the overall sensitivity of the light detection and recording system.

The operation of the apparatus will now be readily understood. The cuvettes 34 are each filled with firefly-lantern enzyme and placed in cuvette holder 30. The cuvette holder 30 is attached to positioning rod 40 and placed in channel 16 which is filled with circulating fluid. A syringe 64 is filled with the ATP test sample and placed in holder 66. The syringe needle is placed into cuvette 34 upon lowering the holder 66 by raising handle 84 thereby moving sliding member 80 downward. The door 14 of housing 10 is closed and dark slide 130 is removed from between light collector 126 and photomultiplier tube 128. The piston 72 of the hydraulic cylinder is actuated by closing switch 112 and then switch 118 through digital counter 122. Movement of piston 72 moves plunger 68 into syringe body 67 injecting some ATP sample into the enzyme mixture to produce the bioluminescent reaction. After a reaction, movement of positioning rod 40 moves another cuvette into position under the syringe holder 66.

Thus there has been provided an ATP detection instrument incorporating a novel reaction chamber which permits a rapid series of tests to detect the presence of ATP in all types of cellular materials.

While a preferred embodiment of the invention has been shown and described, it will be apparent that modification and variations thereof may be made without departing from the underlying principles of the invention. It is, therefore, desired by the following claims to include within the scope of the invention all such variations and modifications by which substantially the results of this invention may be obtained through the use of substantially the same or equivalent means.

What is claimed is:

1. An ATP detection instrument for detecting the presence of cellular products by means of a bioluminescent reaction of test material and a reactant comprising: a reaction chamber, channel means within said reaction chamber, a reactant holder slidably mounted in said channel means, means for injecting test material into said reactant, and light detecting means to detect radiant light from the bioluminescent reaction, said light detecting means including a light collector adjacent said reactant holder and a photomultiplier tube to receive the light passing through the light collector for converting the light from said bioluminescent reaction into a corresponding electric signal.

2. The apparatus of claim 1 wherein fluid circulates within said channel means to regulate the temperature of the reactants within said reactant holder.

3. The apparatus of claim 1 wherein said reactant holder is of rectangular shape having a plurality of openings to receive said reactant.

4. The apparatus of claim 3 wherein there is provided positioning means extending from said reactant holder to the outside of said reaction chamber whereby said reactant holder can be readily moved to place one of said plurality of openings adjacent said test material injection means.

5. The apparatus of claim 1 wherein said means for injecting test material comprises a syringe holder, said syringe holder being movable to move a syringe mounted in said holder in and out of said reactant holder.

6. The apparatus of claim 1 wherein said light collector is an internally reflectorized conical shaped member having two open ends, the larger of said open ends being mounted in said channel means adjacent said reactant holder and the smaller of said open ends being adjacent said photomultiplier tube.

7. The apparatus of claim 1 including a shutter means movable to prevent light from passing into the photomultiplier tube upon opening of said reaction chamber to ambient light.

8. The apparatus of claim 1 wherein said channel means includes reflector means adjacent said reactant holder and aligned with said light detecting means whereby the light generated by said bioluminescent reaction is directed toward said light detecting means.

9. The apparatus of claim 5 wherein said syringe holder is attached at one end to a slidable member and lever means are attached to said slidable member for movement of said slidable member and said holder means.

10. The apparatus of claim 5 wherein a fluid actuated piston is slidable within said syringe holder whereby actuation of said piston will cause injection of test material into said reactant.

11. A reaction chamber for detecting the presence of living matter in a test sample by means of a bioluminescent reaction comprising a housing, closure means for said housing, channel means in said housing, holder means for positioning within said channel means a means for containing a plurality of reactants, fluid means in said channel means for regulating the temperature of said reactants, positioning means extending from said holder means to the outside of said reaction chamber, a syringe holder supported above said holder means for holding a syringe containing a test sample, and a light collector mounted on said channel means, said light collector passing the radiant light from the bioluminescent reaction to light detecting means adjacent said light collector.

12. The apparatus of claim 11 wherein said containing means comprises a rectangular member having a plurality of openings to receive said reactants.

13. The apparatus of claim 12 wherein said positioning means comprises a rod having a plurality of grooved rods, said holder means having means to attach to said arm on said arm on said positioning means whereby movement of said positioning means is transmitted to said holder means.

14. The apparatus of claim 11 wherein said holder means is attached at one end to a slidable member, and actuating means are attached to said slidable member for movement of said slidable member and said holder means, said actuating means including retaining means to retain said actuating means in a set position.

15. The apparatus of claim 14 wherein a fluid actuated piston passes through said slidable member and into the syringe holder, said piston having syringe gripping means whereby actuation of said piston will cause injection of test material into said reactant.

16. An ATP detection instrument comprising, in combination: a reaction chamber for producing a bioluminescent reaction comprising a housing, channel means within said housing, a reactant holder slidably mounted in said channel means, means for injecting test material into said reactant, and light collecting means; fluid actuated means for said injection means; time controlled means for starting and stopping said fluid actuated means; photo-sensitive means for converting the radiation from said light collecting means to corresponding electric signals; and indicator means responsive to said electric signals from said photo-sensitive means.

References Cited

UNITED STATES PATENTS

| | | | |
|---|---|---|---|
| 3,271,112 | 9/1966 | Williams et al. | 23—253 |
| 3,287,089 | 11/1966 | Wilburn | 23—230 XR |
| 3,319,512 | 5/1967 | Isreeli | 23—253 XR |
| 3,327,535 | 6/1967 | Sequeira | 23—259 XR |
| 3,344,702 | 10/1967 | Wood et al. | |
| 3,359,973 | 12/1967 | Hoffman | 195—103.5 |

MORRIS O. WOLK, Primary Examiner

R. E. SERWIN, Assistant Examiner

U.S. Cl. X.R.

23—254; 195—103.5, 127; 356—179, 246